United States Patent
Yokotsuka et al.

[15] 3,647,484
[45] Mar. 7, 1972

[54] METHOD OF PREPARING SOY

[72] Inventors: Tamotsu Yokotsuka, Higashikatsushika-gun; Tatsuo Aonuma, Kashiwa-shi; Koya Mogi; Danji Fukushima; Atsushi Yasuda; Hiroharu Watanabe; Naoshi Tsukada; Akira Arai, all of Noda-shi, Japan

[73] Assignee: Kikkoman Shoyu Co., Ltd., Noda-shi, Japan

[22] Filed: Feb. 27, 1969

[21] Appl. No.: 802,969

[52] U.S. Cl. ...................................................99/145
[51] Int. Cl. ............................................A23l 1/20, A23l 1/22
[58] Field of Search................................................99/145, 98

[56] References Cited

OTHER PUBLICATIONS

Markley, Klare, Soybeans and Soybean Products Vol. II Interscience Publishers Inc. New York 1951 pp. 991– 997

*Primary Examiner*—Raymond N. Jones
*Assistant Examiner*—William Andrew Simons
*Attorney*—Wenderoth, Lind & Ponack

[57] ABSTRACT

A method of preparing soy which is featured in that soybeans obtained by steaming soybeans of a moisture content of 30–70 percent by weight with saturated steam of a gauge pressure not less than 1.8 kg./cm.$^2$ for a short period of time not exceeding 10 minutes, followed by rapid cooling to a temperature not exceeding 100° C. are used as the starting material for the preparation of soy. And the method can provide a soy of superior flavor and of high quality wherein the possibility of the formation of clouds and precipitates when diluted and heated in its use does not occur, and can be carried out industrially advantageously with improved yield and good reproducibility.

5 Claims, 1 Drawing Figure

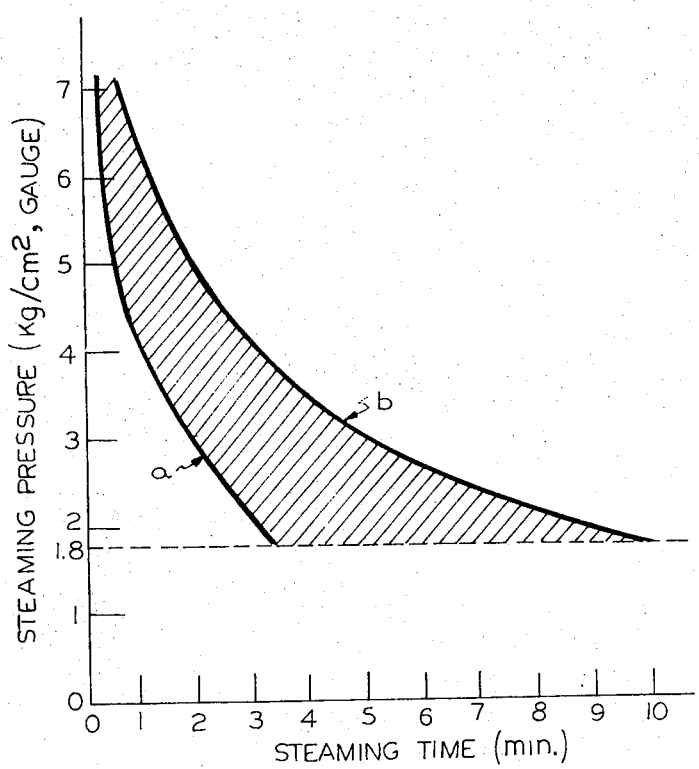

METHOD OF PREPARING SOY

This invention relates to a method of preparing soy, employing an improved operations of treating the starting soybeans, whereby is obtained a soy of superior flavor and of high quality wherein the possibility of the formation of clouds and precipitates due to the coagulation of protein during dilution and heating does not occur and in which the preparation can be carried out commercially advantageously with improved yield and good reproducibility. More specifically, the invention is characterized in that the soybeans utilized as the starting materials for producing soy are initially steam treated under specific conditions before culturing the soybean in the usual manner.

More particularly, the present invention relates to a method of preparing soy by initially steaming soybeans of a moisture content of 30–70 percent by weight with saturated steam of a gauge pressure not less than 1.8 kg./cm.$^2$ for a short period of time not exceeding 10 minutes, followed by rapid cooling to a temperature not exceeding 100° C. and using the thus-treated soybeans as the starting material in the conventional culturing technique as described below.

In preparing soy, generally vegetable protein-containing materials and carbohydrates are used as the principal starting materials. These are treated by customary procedures, after which the mixture is inoculated with aspergilli, the solid culture thereof then being carried out under open conditions to make the "Koji." A soy mash is prepared from this solid Koji by mixing it with a solution of common salt, which mash is then fermented by the activity of the naturally propagating and/or artificially inoculated micro-organisms, principally soy lactic acid bacteria and soy yeasts. The soy is then obtained by removing the solid portion from the brewed mash.

As the foregoing vegetable protein-containing materials and carbohydrates, soybean and wheat are usually used, it being the usual practice to use these as the soy brewing starting ingredients after steaming the former with saturated steam of a gauge pressure of the order of 0.7–1.0 kg./cm.$^2$ (at 115°–119° C.) for about 30–60 minutes and after parching and crushing the latter at normal atmospheric pressure.

It is known that the nitrogen source that can be utilized for the preparation of soy can be increased by the use of soybeans which have been steam treated as hereinabove noted as the starting material for preparing soy. And from long experience soybeans which have been treated at a gauge pressure and for a period of time such as indicated above have been employed as being optimum conditions for the preparation of soy by the brewing method.

While it is not quite clear as to what state of denaturation of the protein is most advantageously utilizable as the nitrogen source during the brewing of soy, it is known that if the steaming treatment for accomplishing the denaturation is insufficient the protein does not readily undergo enzymatic digestion during the preparation of soy. Further, if soy products produced by inadequate steam treatment of soybeans are used, (which soybeans will hereafter occasionally be referred to as native soybeans, and their protein as native protein) is diluted with water and heated in use, the formation of clouds or precipitates cannot be avoided and thus its commercial value as soy is lost. On the other hand, in the case of soybeans which have been denatured to an excessive degree (hereinafter may, at times, be referred to as secondarily denatured soybeans, or its protein as secondarily denatured protein), the rate of digestion of the nitrogen source by means of enzymes declines during the preparation of soy, with the consequence that the yield of soy suffers. Since soy is produced on a large scale, even a few percent decline in yield directly affects the product cost.

Therefore, it is of great importance that soybeans denatured to the optimum state be used in preparing soy by the brewing technique, for not only maintaining the quality of the product which meets that required of soy but also for improving the yield of the product. In the past, a steaming treatment with saturated steam of the order of 0.7–1.0 kg./cm.$^2$ gauge (at a temperature 115–119° C.) for about 30–60 minutes was regarded as being the optimum. The rate of digestion of the proteinaceous nitrogen source of soybeans by means of enzymes that could be achieved in the past by the brewing technique using soybeans which have been steam treated as described was of the order of 80–85 percent, and about 87 percent at most, when indicated by the method of indication hereinafter fully described.

The optimum steaming conditions such as set forth above, which were used in the past, were attained empirically in the art of brewing soy over a long period of time, it being known from experience that in the case of soybeans treated at gauge pressures and treatment times less than those indicated the product soy would contain more or less of the native protein in a relatively high proportion which resulted in the formation of the aforementioned clouds and precipitates when diluted and heated, making the product less commercially valuable other hand, it was known that under conditions exceeding such formerly used gauge pressures and treatment times, the presence in the product soy of secondarily denatured protein in a relatively high proportion resulted in the decline in the rate of digestion of the protein of the material soybeans by means of the enzymes thus bringing about a decline in the yield of the product soy.

With a view to providing a method of advantageously preparing soy by the brewing technique by employment of a more advantageous steaming treatment of the starting materials and in which not only an improvement is had in the yield of the product soy but also the soy so produced is one in which there is no possibility of the formation of clouds or precipitates when being diluted and heated in its use, we made a detailed study of the relationships between the moisture content of the soybean, the gauge pressure of the saturated steam used for the steaming treatment, and the steaming time. As result, we found that there existed an intimate relationship between these three factors.

We further found that by combining the conditions of (1) the use of saturated steam of high gauge pressure (hence elevated temperature) (by which use it was heretofore expected that a major portion of the protein of the material soybean would naturally undergo secondary denaturation to cause a decline in product yield), (2) a short-treatment time (by which use it was heretofore regarded that a major portion of the protein of the material soybeans would naturally remain native to cause a loss of the commercial value of the product soy), and (3) quick cooling of the material soybeans to not over 100° C. after the steaming treatment; contrary to expectations and the optimum conditions that have been established after long experience in the art of preparing soy, soy of excellent quality could be provided industrially advantageously by the brewing technique by means of an improved short period steaming operation of the material soybeans and with an improvement in the yield of the product soy.

It is therefore an object of the present invention to provide a method of preparing soy of superior flavor and of high quality wherein the possibility of the formation of clouds and precipitates when diluted and heated in its use does not occur, and in which the preparation can be carried out industrially advantageously with improved yield and good reproducibility.

Other objects and advantages of this invention will become apparent from the following description.

According to the invention method, in carrying out the conventional method of preparing soy by brewing the starting ingredients for preparing soy, including soybeans, using the soy preparing fungi, as said soybeans are used those whose moisture content is 30–70 percent by weight, which have been steam treated by saturated steam of a gauge pressure not less than 1.8 kg./cm.$^2$ (131° C. at 1.8 kg./cm.$^2$) for a short period of time not exceeding 10 minutes, followed by quickly cooling to a temperature not exceeding 100° C.

For facilitating an understanding of this point, the accompanying drawing, which is a graph illustrating roughly the interrelation of the moisture content of the soybeans and the steam pressure (gauge) of the saturated steam used and the steaming time, will be referred to.

More specifically, the FIGURE is a graph illustrating roughly the relation between the steam pressure (gauge) of the saturated steam used and the steaming time in case the moisture content of the soybeans is 60 percent by weight.

In the FIGURE, the curve *a* indicates the boundary of the degree of denaturation of the material soybeans which separates the soy in which is formed clouds and precipitates to an extent as to be given the hereinafter described "turbidity grade" of 1 or more, and the soy of a turbidity grade of 0 in which no clouds or precipitates are formed. The zone at the left side of curve *a* in this FIGURE is that where a great proportion of the protein of the soybean remains native and hence the commercial value of the product as soy is lost. On the other hand, the curve *b* in the FIGURE indicates by means of the hereinafter described "rate of digestion" the boundary beyond which the yield of the product soy becomes worse because of the large proportion of the secondarily denatured protein in the soybeans. This FIGURE shows that for achieving the commercially satisfactory improvements in the various points as contemplated by the present invention the conditions for steam treating the soybeans must be chosen from those falling within the scope indicated by the hatching in the FIGURE.

This hatch-indicated scope is also influenced by the moisture content of the soybeans as well as their form, but the most important factor is the moisture content. When the moisture content is on the higher side of the aforesaid 30–70 percent by weight range, this scope tends to shift in the left direction of the FIGURE with curves *a* and *b* rising more abruptly. On the other hand, when the moisture content is on the lower side of the foregoing range, the tendency is for the scope to shift in the right direction in the FIGURE with these curves rising more gently.

The soybeans to be steam treated in accordance with the invention may be of any form that is usually used as the starting material for preparing soy, such as whole soybean, soybean flour, defatted soybean flake, or soybean meal, there being no particular restrictions so long as they contain soybean protein which can become the source of nitrogen. In the case of whole soybeans, those whose moisture content is of the order of 30–65 percent, and particularly 55–60 percent by weight, are to be preferred. On the other hand, in the case of those of other form, preferred are those of a moisture content of 45–70 percent, and particularly 55–65 percent by weight.

For bringing the moisture content up to these levels, the beans are either soaked in water or added the water by sprinkling, spraying or any other suitable means. If the moisture content is less than that indicated by the foregoing ranges, the proportion of the protein remaining native in the soybeans after steaming becomes such that it causes a loss in the commercial value of the product soy. For example, the dried whole soybean that is usually available has a moisture content of about 10 percent by weight. Now, if such dried soybean is given a steaming treatment without increasing its moisture content, even though it has been given a steaming treatment for about 3 hours, the soy product forms clouds or precipitates upon dilution, and heating, which phenomena is caused by the presence of native protein in the soybean. On the other hand, the employment of a moisture content in excess of the foregoing range makes it difficult to carry out either the steam treatment operation itself or the subsequent Koji-making steps.

The steaming treatment is carried out with saturated steam of a gauge pressure not less than 1.8 kg./cm.$^2$. On the other hand, the steaming time employed (which is the period of time after the prescribed pressure of not less than 1.8 kg./cm.$^2$ has been reached) is a short period of time not exceeding 10 minutes. In general, when the gauge pressure is high, a relatively short period of time is employed, whereas when the gauge pressure is a low value close to the aforesaid 1.8 kg./cm.$^2$, a time preferably close to 10 minutes is used. A pressure ranging between 1.8 and 15 kg./cm.$^2$ gauge is usually chosen, but preferred is a pressure 2.0–9.0 kg./cm.$^2$ gauge and especially recommended is a pressure 4–7 kg./cm.$^2$ gauge. As the gauge pressure is increased, the treatment time is correspondingly shortened suitably. For example, at a pressure of 3 kg./cm.$^2$ gauge, a treatment time of the order of 2–4 minutes is employed, whereas at a pressure of 5 kg./cm.$^2$ gauge, a shortened time of the order of 30 seconds to 2 minutes is suitable. However, a short treatment time of such, say, as one-half second, which is operationally difficult of being practiced should preferably be avoided. Needless to say, in an apparatus wherein the steaming operation is carried out by placing thin layers of the soybeans on grated plates in multistage fashion, a short-steaming treatment of such as a few seconds can also be employed. Normally, it is, however, preferred that the gauge pressure of the saturated steam is so chosen that the treatment time becomes from about 1 second to 10 minutes, and preferably from about 15 seconds to 6 minutes.

Thus, the time for the steaming treatment can be reduced to less than one-third of that of the conventional method, for example, even as much as less than one-thirtieth, with the consequence that great advantages are had in connection with the steam treatment operation of the material soybeans.

When the soybeans to be used as starting material are those which have been treated in accordance with the present invention with higher gauge pressures (and hence at elevated temperature) and shorter treatment times than the steaming conditions which were heretofore recommended, the denaturation of the protein contained in the soybeans becomes such that it is most suitable for the purpose of soy brewing. In this case, as soon as the steaming treatment has been completed, the treated soybeans must be cooled as quickly as possible to a temperature not exceeding 100° C. While the cooling time will vary depending upon the gauge pressure at which the treatment is carried out, in general, it is preferred that the reduction to a temperature not exceeding 100° C. be carried out at shorter periods of time in the case of higher gauge pressures. For example, in the case where the gauge pressure does not exceed 3 kg./cm.$^2$ (143° C.) the temperature of the treated soybeans should be reduced to below 100° C. within at most 15 minutes, and preferably within 5 minutes. On the other hand, when the pressure exceeds 3 kg./cm.$^2$ the reduction of the temperature to below 100° C. should be accomplished within at most 5 minutes, and preferably within 1 minute. Thereafter, the temperature preferably should be cooled to the neighborhood of 40° C. as promptly as possible. This is because the protein, which, as a result of its treatment at an elevated temperature for a short period of time, has become readily susceptible to digestion by enzymes, is more sensitive to heat than the protein which has received the conventional treatment, with the consequence that the progress of secondary denaturation is apt to take place and rather render the rate of enzymatic digestion of the protein worse than that of the conventional method. Hence, the slow cooling of the soybeans after completion of its steaming greatly reduces the effects of the present invention.

The cooling can be accomplished by withdrawing the soybeans from the steaming zone and spreading them out and allowing them to cool by exposure to air, at which time air can be positively blown against the soybeans. This air can be cooled air. Alternatively, quick cooling can be carried out by employment of a reduced pressure means such as a jet condenser or a vacuum pump and evaporating the moisture content of the treatment-completed soybeans which are in the steaming zone or have been removed therefrom, thus utilizing the latent heat of the moisture which is evaporated to accomplish the cooling. A still another very effective means of achieving the objective of the present invention is to discharge the streaming treatment-completed soybeans from the pressure treatment vessel filled with the saturated steam instantaneously to air of normal pressure or to a low-pressure environment of a pressure close to that of normal atmospheric pressure to effect the sudden cooling of the soybeans by the so-called puffing phenomenon.

An illustration is presented in Table I, below showing the different rates at which the proteins are digested by means of the enzymes produced by the fungi which are typically used in the brewing of soy in the several cases of the soybeans treated in accordance with the invention method, the soybeans which have undergone treatment at conditions in which either the gauge pressure or treatment time does not satisfy the requirements of the present invention, and soybeans treated in accordance with the heretofore recommended and practiced conditions.

The values of the rate of digestion and turbidity grade used in the table were measured in the following manner, and the greater the value of the rate of digestion, the more suitable is the protein denatured for the purpose of brewing soy, hence also indicating that the yield of the product soy is high. On the other hand, as to the turbidity grade, a value of grade 1 or higher indicates that as soy the product is one of poor or no commercial value, since clouds and precipitates are formed during its dilution and heating.

Method of Measuring the Rate of Digestion

Soybeans whose steaming treatment has been completed are vacuum dried at a low temperature and the comminuted. One gram of the powdered specimen is placed in a shaking-type test tube, to which are then added 10 ml. of 0.5 mol phosphoric acid buffer solution (pH=7.2), 20 ml. of an enzyme solution (see note) and 1 ml. of toluol, after which the test tube is tightly stoppered. The enzymatic digestion is then carried out by maintaining the temperature of this test tube at 37° C. for 168 hours (7 days) while gently shaking the tube.

After completion of the above-described digestion, distilled water is added to the digestion liquid to make the total quantity 100 ml. This is followed by using a centrifuge and separating the liquid and solid phases. Taking 30 ml. of this liquid phase portion, 15 ml. of 1.2 mol trichloroacetic acid are added thereto, whereupon the undigested protein precipitates. After filtering off this precipitate, the nitrogen content in 5 ml. of the filtrate is measured in accordance with the Kjeldahl method. Separately, a blank test is conducted in similar manner but without adding the foregoing powdered specimen and the nitrogen content is determined in similar manner. The value obtained by subtracting the value of the latter from that of the former is designated A.

On the other hand, the nitrogen content of 1 gram of the foregoing powdered specimen is determined by the Kjeldahl method, and the value obtained is designated B.

The rate of digestion by means of the enzyme is then calculated in the following manner from the aforesaid values $A$ and $B$.

$$\text{Rate of digestion (\%)} = \frac{A \times \frac{30+15}{5} \times \frac{100}{30}}{B} \times 100$$

$$= \frac{A \times 30}{B} \times 100$$

NOTE.—The aforesaid enzyme solution denotes an extraction solution extracted from a solid Koji of wheat bran obtained by using *Aspergillus sojae*, a typical fungus used for brewing soy, and having a proteinase activity of $53[PU]_{\gamma-tyr.}^{Cas.\ 30°C.\ F.R.}/ml$. $1[PU]_{\gamma-tyr.}^{Cas.\ 30°C.\ F.R}/ml$. as here used, represents the activity of proteinase which forms 1 $\gamma$ of tyrosine per minute when the enzymatic reaction is carried out at 30° C. and pH=7.2 using as the substrate 1% milk casein.

Measurement of Turbidity Grade

After having conducted the enzymatic digestion in accordance with the method of measuring the rate of digestion as hereinbefore described, in adding the distilled water to the digestion liquid to make its total volume 100 ml. instead of the distilled water an aqueous NaCl solution is used, which is added such that the NaCl concentration in the total solution becomes 1.8–2.0 percent. Next, a centrifuge is employed, and the liquid and solid phases are separated. Half of the liquid phase portion is heated at 100° C. for 5 minutes, while the unheated other half is used as control. The two are then compared with the unaided eye and the turbidity grade is determined in accordance with the following standard:

| | Grade |
|---|---|
| Clouds formed | 1 |
| Precipitates formed | 2 |
| No discernible formation of clouds | 0 |

TABLE I

| Experiment | Steaming treatment | | | Rate of digestion (percent) | Turbidity grade |
|---|---|---|---|---|---|
| | Gauge pressure, kg./cm.² (temperature ° C.) | Treatment time | Time required to cool to 100° C. | | |
| Conventional method | 0.9 (117) | 45 minutes | 20 minutes | 86.13 | 0 |
| Comparison 1 | 1.2 (123) | 10 minutes | 10 minutes | 81.05 | 2 |
| Present invention | 1.8 (131) | 8 minutes | 3 minutes | 91.40 | 0 |
| Comparison 2 | 1.8 (131) | 15 minutes | do | 80.23 | 0 |
| Present invention | 2.0 (133) | 5 minutes | do | 91.60 | 0 |
| Comparison 3 | 2.0 (133) | do | 20 minutes | 83.50 | 0 |
| Present invention | 3.0 (143) | 3 minutes | 3 minutes | 92.99 | 0 |
| Do | 4.0 (152) | 2 minutes | 1 minute | 93.74 | 0 |
| Do | 5.0 (159) | 1 minute | 40 seconds | 94.50 | 0 |
| Do | 6.0 (165) | 30 seconds | do | 94.90 | 0 |
| Do | 7.0 (170) | 15 seconds | do | 95.10 | 0 |

NOTE.—Soybean used was defatted soybean flake of a moisture content of 60% by weight.

As apparent from the results given in Table I, above, it is possible according to the present invention to choose the gauge pressure, steaming time and the time to cool to a temperature not exceeding 100° C. so that the rate of digestion becomes at least 90 percent, and preferably at least 92 percent, and the turbidity grade becomes 0. A rate of digestion and turbidity grade which both satisfy the foregoing requirements at the same time cannot be achieved with the hitherto proposed conditions.

In the present invention, excepting that soybeans which have been steam treated as hereinbefore fully described are used as the starting material, the preparation of soy is otherwise carried out in accordance with the brewing technique well known in the art. That is to say, parched and crushed wheat is added to the soybeans which have received the steaming treatment in accordance with the invention method, as hereinbefore described, and the two are mixed together. The mixture is then inoculated with aspergilli and by carrying out the solid culture at 23°–35° C. for 40–90 hours Koji is obtained.

Next, a soy mash (moromi) is prepared from this solid Koji by mixing it with a solution of common salt. This mash is stored for 4–18 months in storage tanks until fully matured. During this period the mash is fermented by the activity of the naturally propagating and/or artificially inoculated micro-organisms, principally soy lactic acid bacteria and soy yeasts. The matured mash is separated into filtrate (unpasteurized soy) and cake by pressing. Refined soy is obtained by heating this filtrate to pasteurize it.

The aspergilli here used are those aspergilli known in the soy brewing art and can be freely chosen and used. As such aspergilli, those which are used most commonly are the fungi of the genus Apergillus, particularly the yellow Aspergilli, while those referred to as conidia heads are green, blue-green or yellow and are fungi which do not form perithecia and ascospores [the classification in Thom & Raper, "Manual of the Aspergilli" (1945, William & Wilkins)]. Specifically, the following groups can be named:

1. *Aspergillus flavus-oryzae* group,
2. *Aspergillus ochraceus* group, and
3. *Aspergillus tamarii* group.

As examples of fungi belonging to the aforesaid *Aspergillus flavus-oryzae* group, included are *Aspergillus oryzae*, *Aspergillus sojae*, *Aspergillus oryzae* var. *microsporus*, *Aspergillus oryzae* var. *magnasporus*, etc. As examples of those belonging to the *Aspergillus ochraceus* group, included are *Aspergillus ochraceus*, *Aspergillus melleus*, *Aspergillus oniki*, etc. And as examples of those belonging to the *Aspergillus tamarii* group, included are *Aspergillus tamarii*, etc. However, Sakaguchi & Yamada (J. Agr. Chem. Soc. Japan 20 65 (1944)) differentiate these by the following classification:

I. The *Aspergillus sojae* which has a small projection formed on its conidia and whose conidiophore wall is smooth, and II. That of the *Aspergillus flavus-oryzae* group, which does not have a small projection on its conidia and whose conidiophore wall is rough.

However, since Thom & Raper holds that *Aspergillus sojae* belongs to the *flavus-oryzae* group, we wish to add that the fungi to be used in this invention comprehends any and all of those in accordance with any of the foregoing classifications.

The soy lactic acid bacteria and soy yeasts used in the fermentation step are those micro-organisms which are known in the art of soy preparation. These lactic acid bacteria may be any which range from those which are salt tolerant to halophilic and anaerobic to microaerophilic, which can form lactic acid and can assist the growth of the yeasts and ripen the soy aroma and flavor. Included are, for example, *Pediococcus*, *Lactobacillus*, *Streptococcus*, *Tetracoccus*, etc. Depending upon the lactic acid bacteria, there are some which perform homofermentation while there are some which perform heterofermentation. Either can be used.

One of the bacteria most commonly used in brewing soy is exemplified by *Pediococcus soyae*. According to the classification of Nakagawa & Kitahara (J. Gen. Application Microbiol. 5 95 (1957)) said *Pediococcus soyae* is held to be a variety sp. of *Pediococcus halophilus* MEES (1934).

Further, the soy yeasts such as noted hereinbefore are also well known in the art. These yeasts possess osmophilic property, are salt tolerant or halophilic and usually possess sugar tolerance. Preferably it is those which can carry out fermentation of such as alcohol in the presence of above 15 percent of common salt. There are those of these yeasts which belong to either the family Endomycetaceae or the family Cryptococcaceae in accordance with the classification of yeasts, in Rodder & Kreger Van Rij, "The Yeasts, A Taxonomic Study." Examples of those belonging to Endomycetaceae include such as *Saccharomyces rouxii* and *Saceharomyces acidifaciens*. *Saceharomyces rouxii* comprehends those micro-organisms which are referred to as *Zygosaccharomyces soyae*, *Zygosaccharomyces major*, *Zygosaccharomyces sulsus*, etc., and osmophilic Zygosaccharomyces. Those belonging to Cryptococcaceae include the genus Tolulopsis yeasts such as *Tolulopsis versatilis*, *Tolulopsis sphaerica*, *Tolulopsis sake*, *Tolulopsis halophilus*, etc. These yeasts may be used either singly or in combination according to this invention.

The following examples are given for illustrating one mode of practicing the present invention.

EXAMPLES 1-3

Steaming Treatment of Soybeans (i)

Ninety-nine kilograms of defatted soybean flakes sprinkled with 129 liters of water (moisture content 60.9 percent were continuously introduced into a steaming kettle of saturated steam pressure of 7.0 kg./cm.$^2$ gauge, held in residence therein for 15 seconds and thereafter continuously discharged into air to be cooled rapidly, thereby obtaining steamed defatted soybean flakes whose temperature was 40° C. one minute later.

Steaming Treatment of Soybeans (ii)

Ninety-nine kilograms of defatted soybean flakes sprinkled with 129 liters of water (moisture content 60.9 percent) were steamed for 2 minutes in a steaming kettle of saturated steam pressure of 4 kg./cm.$^2$ gauge, after which the pressure of the kettle was reduced to normal atmospheric pressure in 1 minute, thus reducing the temperature of the defatted soybean flakes to below 100° C. This was followed by jetting pressurized water into a jet condenser connected to the steaming kettle to thereby accomplish the rapid suction of the steam inside the steaming kettle and the moisture content of the steamed defatted soybean flakes. Thus was obtained defatted soybean flakes having a temperature of 40° C.

Steaming Treatment of Soybeans (iii)

Ninety-nine kilograms of defatted soybean flakes sprinkled with 129 liters of water (moisture content 60.9 percent were steamed for 5 minutes in a steaming kettle with saturated steam of 2 kg./cm.$^2$ gauge pressure, after which the pressure inside the kettle was reduced to normal atmospheric pressure in 40 seconds to thus reduce the temperature of the defatted soybean flakes to below 100° C. Immediately thereafter the steamed defatted soybean flakes were taken out from the steaming kettle and spread out in a layer of several centimeter thickness atop a wire netting-like belt conveyor. While the layer of steam-treated defatted soybean flakes was conveyed along on this belt conveyor, sterilized air was passed rapidly through the layer at a given location. Thus was obtained steamed defatted soybean flakes having a temperature of 40° C.

Steamed defatted soybean flakes obtained by the foregoing treatments (i) - (iii) in amounts of 99 kg. (calculated as the amount before treatment) were used, to which were added 94 kg. of parched and crushed wheat. These mixtures were then inoculated a strain of *Aspergills soyae* and the solid culture was carried out at 25°–33° C. for 70 hours to obtain Koji, following which 360 liters of 24.5 percent by weight brine were added and the mixtures were stored and fully matured for 120 days at 28°–30° C. On the other hand, as starting material treated in accordance with the conventional method, 99 kg. of defatted soybean flakes sprinkled with 129 liters of water (moisture content 60.9 percent) and thereafter steamed for 45 minutes with saturated steam of a gauge pressure of 0.9 kg./cm.$^2$ were used, and under identical conditions as hereinbefore described the so obtained steamed defatted soybean flakes were made into Koji, added the brine and stored and fully matured. The results of a comparison of the so obtained soys as to their composition are shown in Table II.

TABLE II

| Example | Percent | | | | | |
|---|---|---|---|---|---|---|
| | Common salt | Total nitrogen | Nitrogen in amino form | Yield of nitrogen | Rate of digestion | Turbidity grade |
| Conventional method | 17.40 | 1.653 | 0.817 | 82.05 | 86.13 | 0 |
| Example: | | | | | | |
| 1 [treatment (i)] | 17.40 | 1.778 | 0.878 | 88.26 | 95.10 | 0 |
| 2 [treatment (ii)] | 17.40 | 1.752 | 0.839 | 86.87 | 93.74 | 0 |
| 3 [treatment (iii)] | 17.40 | 1.697 | 0.837 | 84.24 | 91.60 | 0 |

As apparent from these results, the yield of nitrogen is much greater when the starting material treated according to the method of the present invention is used as compared with the use of that treated in accordance with the conventional method.

The term "yield of nitrogen," as used in Table II, denotes the ratio of the total nitrogen dissolved in the liquid portion of the matured soy mash to the total nitrogen of the protein contained in the soybean and wheat, the soy starting materials.

EXAMPLE 4

129 kg. of whole soybeans were soaked in cold water for 15 hours and drained of the water for 1 hour (moisture content 58 percent). These soybeans were introduced into a treatment kettle containing saturated steam of 6 kg./cm.$^2$ gauge pressure and were held therein for 40 seconds, after which they were suddenly discharged into air and cooled. Ninety-four kilograms of parched and crushed wheat were added to the so treated soybeans and, after being inoculated with *Aspergillus soyae*, the solid culture of the mixture was carried out at 25–33° C. for 70 hours to obtain Koji. Three hundred and sixty Liters of 24.5 percent brine were then added to the so obtained Koji, and the mixture was stored and fully matured at 30° C. for 120 days to obtain a soy mash of good flavor. The rate of digestion was 92.85 percent, the turbidity grade was 0, and the yield of nitrogen was 85.34 percent.

EXAMPLE 5

Sixty kilograms of whole soybeans which had been soaked in cold water for 15 hours and thereafter drained of the water for 1 hour (moisture content 59 percent) were mixed with 50 kg. of defatted soybean flakes which had been sprinkled with 50 liters of water (moisture content 60 percent). This soybean mixture was charged to a treatment kettle whose saturated steam pressure was 6 kg./cm.$^2$ gauge where the soybean mixture was held for 30 seconds, after which the mixture was suddenly discharged into air to obtain a cooled mixture of the whole soybeans and defatted soybean flakes. Ninety-four kilograms of parched and crushed wheat were mixed with the foregoing mixture, and thereafter as in Example 4 the Koji was prepared, the brine was added and the resulting soy mash was stored and fully matured at 28° C. for 180 days to obtain a soy mash of good flavor. The rate of digestion was 93.01 percent, the turbidity grade was 0, and the yield of nitrogen was 86.18 percent.

We claim:

1. In the method of preparing soy by steaming soybeans, mixing the steamed soybeans principally with carbohydrates as the starting materials, inoculating this mixture with aspergilli, culturing the mixture to form solid Koji, adding a solution of common salt to form a soy mash and removing the solid portion from the brew mash thus-obtained, the improvement wherein the initial steam treatment is carried out by steaming soybeans of a moisture content of 30–70 percent by weight in the presence of saturated steam of a gauge pressure not less than 1.8 kilograms per square centimeter for a time not exceeding 10 minutes, followed by quickly cooling the steamed soybeans to a temperature not exceeding 100° C.

2. The method according to claim 1, wherein the steaming is completed so that the rate of digestion of the soybeans becomes not less than 90 percent and the turbidity grade thereof is zero.

3. The method according to claim 1 wherein said gauge pressure ranges between 2 kilograms per square centimeter and 15 kilograms per square centimeter.

4. The method according to claim 1 wherein said steaming time ranges between 1 second and 10 minutes.

5. The method according to claim 1 wherein the time required to cool said steamed soybeans quickly to a temperature not exceeding 100° C. is a time not exceeding 15 minutes.

* * * * *